(12) United States Patent
Kang et al.

(10) Patent No.: US 6,424,401 B1
(45) Date of Patent: Jul. 23, 2002

(54) LCD PANEL WITH SEAL CROSSING OPENING IN AN ORGANIC PROTECTIVE FILM

(75) Inventors: In Byeong Kang; In Duk Song, both of Kumi; Sung Il Park, Anyang, all of (KR)

(73) Assignee: LG. Philips LCD Co., Ltd., Seoul (KR)

(*) Notice: Subject to any disclaimer, the term of this patent is extended or adjusted under 35 U.S.C. 154(b) by 0 days.

(21) Appl. No.: 09/635,206

(22) Filed: Aug. 9, 2000

(30) Foreign Application Priority Data

Aug. 11, 1999 (KR) .............................. 99-32890

(51) Int. Cl.⁷ ............................................ G02F 1/1339
(52) U.S. Cl. ..................................................... 349/153
(58) Field of Search ................................. 349/190, 153

(56) References Cited

U.S. PATENT DOCUMENTS 4,929,060 A    5/1990  Sugimoto et al. ........... 350/339
5,317,434 A  * 5/1994  Ohara ............................ 359/68
6,011,608 A  * 1/2000  Tanaka ......................... 349/153
6,275,278 B1 * 8/2001  Ono et al. .................... 349/152

FOREIGN PATENT DOCUMENTS

JP        01-283515        11/1989

* cited by examiner

Primary Examiner—Toan Ton
Assistant Examiner—Andrew Schechter
(74) Attorney, Agent, or Firm—McKenna Long & Aldridge LLP

(57) ABSTRACT

A liquid crystal display panel that is capable of preventing a leakage of a liquid crystal caused by an exterior impact. In the panel, a link part is provided within the lower plate in a direction crossing the seal to apply a driving signal from the exterior thereof to the picture display part. An organic protective film is entirely coated on the lower plate provided with the link part and has a hole formed in such a manner that the link part contacts the seal. Accordingly, an adhesive between the seal and the lower plate is improved, so that a leakage of the liquid crystal caused by the exterior impact can be prevented.

28 Claims, 7 Drawing Sheets

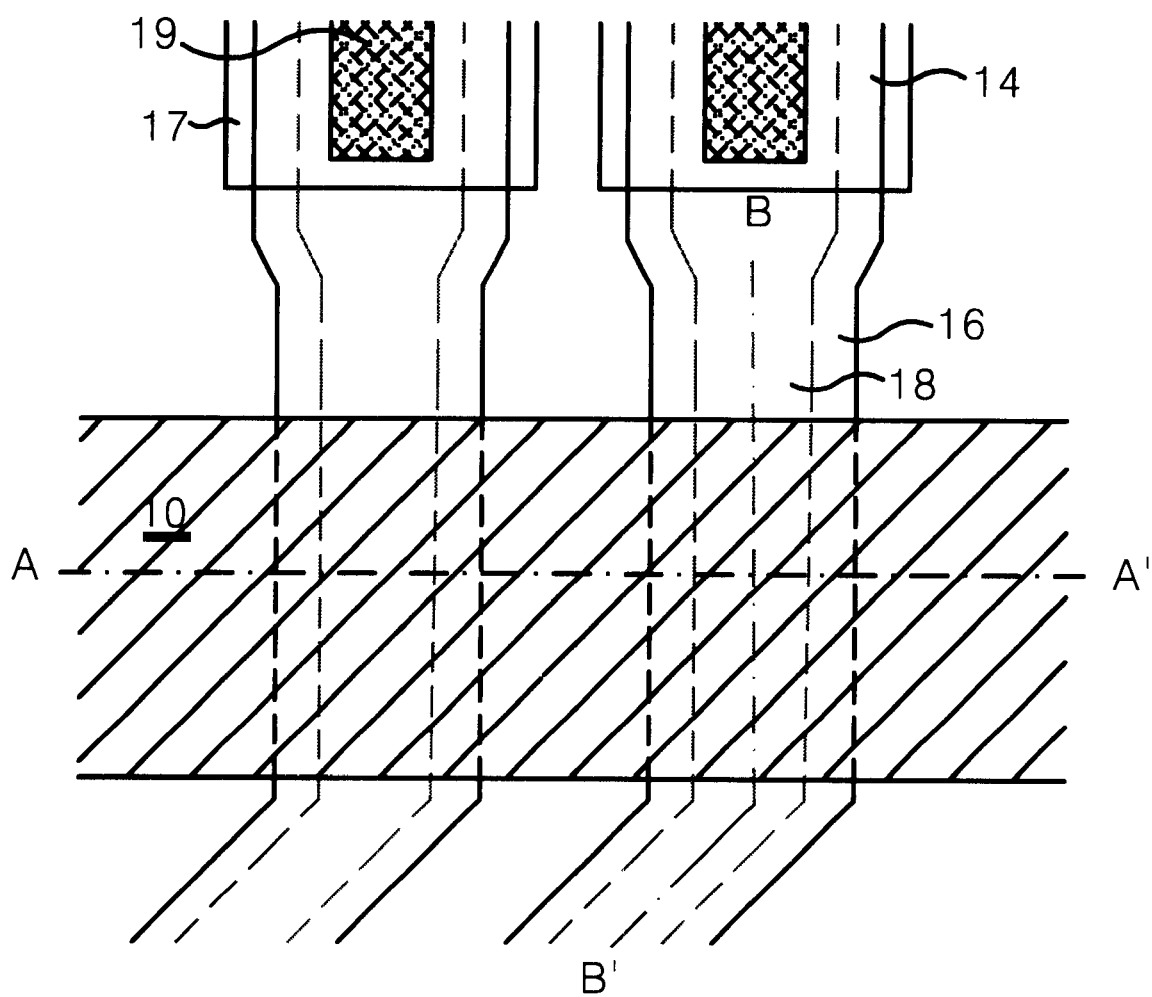

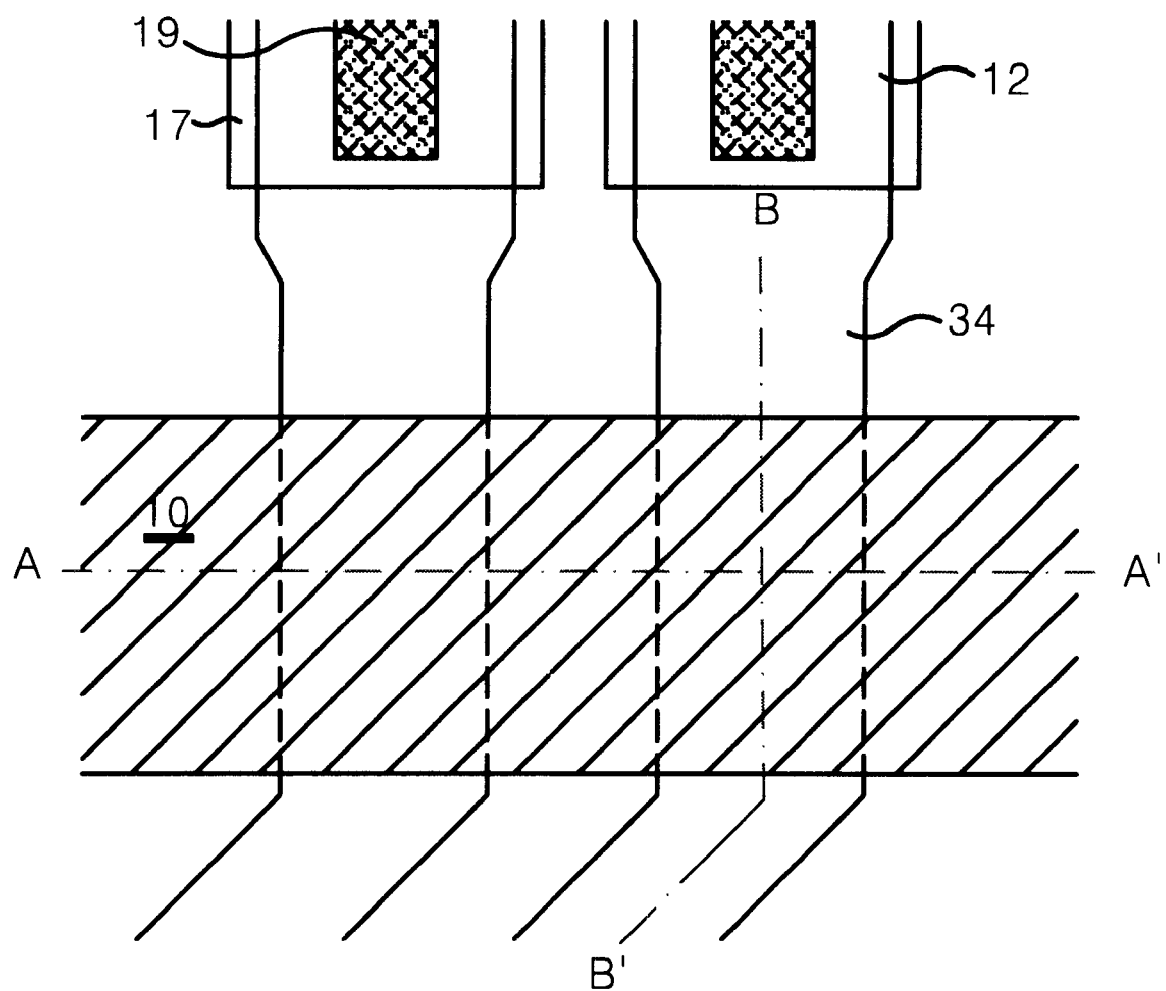

LCD PANEL WITH SEAL CROSSING OPENING IN AN ORGANIC PROTECTIVE FILM

BACKGROUND OF THE INVENTION

1. Field of the Invention

This invention relates to a liquid crystal display panel, and more particularly to a liquid crystal display panel, which is capable of preventing a leakage of liquid crystal caused by an exterior impact.

2. Description of the Related Art

Generally, a liquid crystal display (LCD) controls the light transmissivity of liquid crystal cells arranged in a matrix pattern in response to a video signal to thereby display a picture corresponding to the video signals on a liquid crystal display panel. To this end, the LCD includes a liquid crystal display panel having liquid crystal cells arranged in an active matrix type, and driving integrated circuits (IC's) for driving the liquid crystal cells. The driving IC's are usually manufactured in chip form. The driving IC's is mounted on a tape carrier package (TCP) when they are manufacture by a tape automated bonding (TAB) system while being mounted along the edge of the liquid crystal panel when they are manufactured by a chips on glass (COG) system. In the case of TAB system, the driving IC's are electrically connected to a pad portion provided along the edge of the liquid crystal panel by the TCP. The pad portion is connected to electrode lines connected to each liquid crystal cell of the liquid crystal panel to apply driving signals generated from the driving IC's to each liquid crystal cell.

FIG. 1 is a plan view of a structure of a conventional liquid crystal display panel. In FIG. 1, the liquid crystal panel 2 has such a structure that a lower plate 4 and an upper plate 6 are adhered to be opposed in parallel to each other. The liquid crystal panel 2 includes a picture display part 8 having liquid crystal cell arranged in a matrix pattern, a gate pad 12 and a data pad 14 connected between driving IC's (not shown) and the picture display part 8, a gate link 34 and a data link 16 for connecting the gate pad 12 and the data pad 14 to the picture display part 8, respectively, and a sealing part provided at the outer circumference of the picture display part 8 so as to bond the lower plate 4 to the upper plate 6. In the picture display part 8, data lines to each of which a video signals is applied via the data pad 14 and the data link 16 are intersected with gate lines to each of which a scanning signal is applied via the gate pad 12 and the gate link 34 at the lower plate 4. At each of the intersections, a thin film transistor (TFT) for switching the liquid crystal cell and a pixel electrode connected to the thin film transistors to drive the liquid crystal cells are provided. Color filters coated separately for each area by a black matrix and a common transparent electrode coated on the surfaces of the color filters are provided at the upper plate 6. The lower plate 4 and the upper plate 6 having the configuration as describe above are spaced by a spacer to provide a cell gap. The cell gap is filled with a liquid crystal material. The lower plate 4 is adhered to the upper plate 6 by a sealant coated on the seal 10 positioned at the circumference of the picture display part 8. The gate pad 12 and the data pad 14 are located at the edge of the lower plate 4 which is not overlapped with the upper plate 6. Each of the gate pad 12 applies a gate signal from the gate driving IC, via the gate link 34, to the gate lines of the picture display part 8. Each of the data pad 14 applies a video signal applied from the data driving IC, via the data link 16, to the data line of the picture display part 8.

In the liquid crystal panel 2 having the structure as described above, a protective film for protecting the metal electrodes and the thin film transistors are entirely coated on the lower plate 4. The pixel electrode is formed on the protective film for each cell area. The pixel electrode is a transparent electrode made from indium tin oxide (ITO), and which has a relatively strong durability to the liquid crystal material. Generally, an inorganic material such as $SiN_x$ or $SiO_x$ has been used as the protective film. Since the conventional liquid crystal panel includes the inorganic protective film with a high dielectric constant, it has a problem in that a coupling effect caused by a parasitic capacitor between the pixel electrode and the data line having the inorganic protective film therebetween is increased. In order to minimize the coupling effect, it is necessary to keep a space between the two electrodes at a relatively long distance, for example, 3 to 5 μm and form the pixel electrode having a small area. Accordingly, in the conventional liquid crystal display panel, an aperture ratio depending on the area of the pixel electrode is inevitably lowered to that extent. In order to solve this problem, an organic material, such as benzocyclobutene (BCB), with a relatively low dielectric constant has been used as the protective film. Since this organic protective film has a low dielectric constant of about 2.7 to overlap the pixel electrode with the data line, the area of the pixel electrode can be increased to that extent, thereby improving the aperture ratio.

When the lower and upper plates of the liquid crystal display with such a high aperture ratio are adhered with a sealant, the sealant usually contacts the organic protective film of the lower plate. However, the organic protective film such as an epoxy resin has a strong adhesive characteristic with respect to a glass and the conventional inorganic protective film while having a weak adhesive characteristic with respect to the organic protective film. For this reason, when an impact is applied to the liquid crystal panel, a liquid crystal is leaked through the sealing part having a poor adhesive between the sealant and the organic protective film. Also, the organic protective film has a poor adhesive characteristic with respect to a gate insulating film positioned at the lower part thereof. Accordingly, a crack is generated also between the organic protective film and the gate insulating film by an exterior impact to cause a leakage of the liquid crystal. Hereinafter, such problems of the conventional liquid crystal display will be described in detail with reference to the accompanying drawings.

FIG. 2 is an enlarged view of a crossing part between the data link and the sealant in FIG. 1. In FIG. 2, the data link 16 is provided along with the data pad 14 and the data line (not shown) of the picture display part 8. A semiconductor layer 18 is extended into the data pad 14 at the lower portion of the data link 16. The seal 10 coated with a sealant is located in a direction crossing the data link 16. In this case, because the sealant is coated on the organic protective film, it has a weak adhesive. The data pad 14 contacts a transparent electrode 17 through a contact hole defined at the organic protective film. The transparent film 17 is responsible for protecting a metal electrode as the data pad 14 and for preventing an oxidation of the metal electrode during the repetition of a TCP adhesion required for the TAB process.

FIG. 3A shows a vertical section taken along the A—A' line in FIG. 2, and FIG. 3B shows a vertical section taken along the B—B' line in FIG. 2. In FIGS. 3A and 3B, the lower plate 4 has such a structure that the gate insulating layer 22, the semiconductor layer 18 and the data link 16 are sequentially disposed on a lower glass substrate 20 and the organic protective film 24 is entirely coated thereon. The upper plate 6 has such a structure that the color filter and the black matrix 28 are provided on an upper glass substrate 30 and the common transparent electrode 26 is entirely coated thereon. The lower plate 4 and the upper plate 6 having the structure as described above are bonded to each other by the seal 10. In this case, the seal 10 has a weak adhesive because it is adhered to the organic protective film 24. Also, since the organic protective film 24 has a weak adhesive characteristic with respect to the gate insulating film 22 provided at the lower portion thereof, a leakage of the liquid crystal is caused when a crack is generated from the exterior impact. In FIG. 3B, the right side of the seal 10 represents the picture display part 8 into which the liquid crystal 32 is injected.

FIG. 4 is an enlarged view of a part of a gate link crossing the sealing part in FIG. 1. In FIG. 4, the gate link 34 is provided along with the gate pad 12 and the gate line (not shown) of the picture display part 8. The gate pad 12 contacts the transparent electrode 17 through the contact hole 19 formed via the gate insulating film and the organic protective film. The seal 10 coated with the sealant is arranged in a direction crossing the gate link 34. In this case, the seal 10 also has a weak adhesive because it is adhered to the organic protective film.

FIG. 5A shows a vertical section taken along the A—A' line in FIG. 4, and FIG. 3B shows a vertical section taken along the B—B' line in FIG. 4. In FIGS. 5A and 5B, the lower plate 4 has such a structure that the gate link 34 and the gate insulating layer 22 are sequentially disposed on a lower glass substrate 20 and the organic protective film 24 is entirely coated thereon. On the other hand, the upper plate 6 has such a structure that the color filter and the black matrix 28 are provided on an upper glass substrate 30 and the common transparent electrode 26 is entirely coated thereon. The lower plate 4 and the upper plate 6 having the structure as described above are bonded to each other by the seal 10. In this case, the seal 10 has a weak adhesive because it is adhered to the organic protective film 24.

As a result, the conventional liquid crystal panel with a high aperture ratio employing the organic protective film has a problem in that, due to a weak adhesive between the sealant and the organic protective film or between the organic protective film and the gate insulating film, a crack is generated when an exterior impact is applied thereto to cause a leakage of liquid crystal.

SUMMARY OF THE INVENTION

Accordingly, it is an object of the present invention to provide a liquid crystal display panel that is capable of preventing a leakage of a liquid crystal from an exterior impact.

In order to achieve these and other objects of the invention, a liquid crystal display panel according to an embodiment of the present invention includes a link part provided within a lower plate in a direction crossing a seal to apply a driving signal from the exterior thereof to a picture display part; and an organic protective film entirely coated on the lower plate provided with the link part and having a hole formed in such a manner that the link part contacts the seal.

BRIEF DESCRIPTION OF THE DRAWINGS

These and other objects of the invention will be apparent from the following detailed description of the embodiments of the present invention with reference to the accompanying drawings, in which:

FIG. 2 is an enlarged view of a crossing portion between the data link and the seal in FIG. 1;

FIG. 4 is an enlarged view of a crossing portion between the gate link and the seal in FIG. 1;

DETAILED DESCRIPTION OF THE PREFERRED EMBODIMENT

Figure 1:
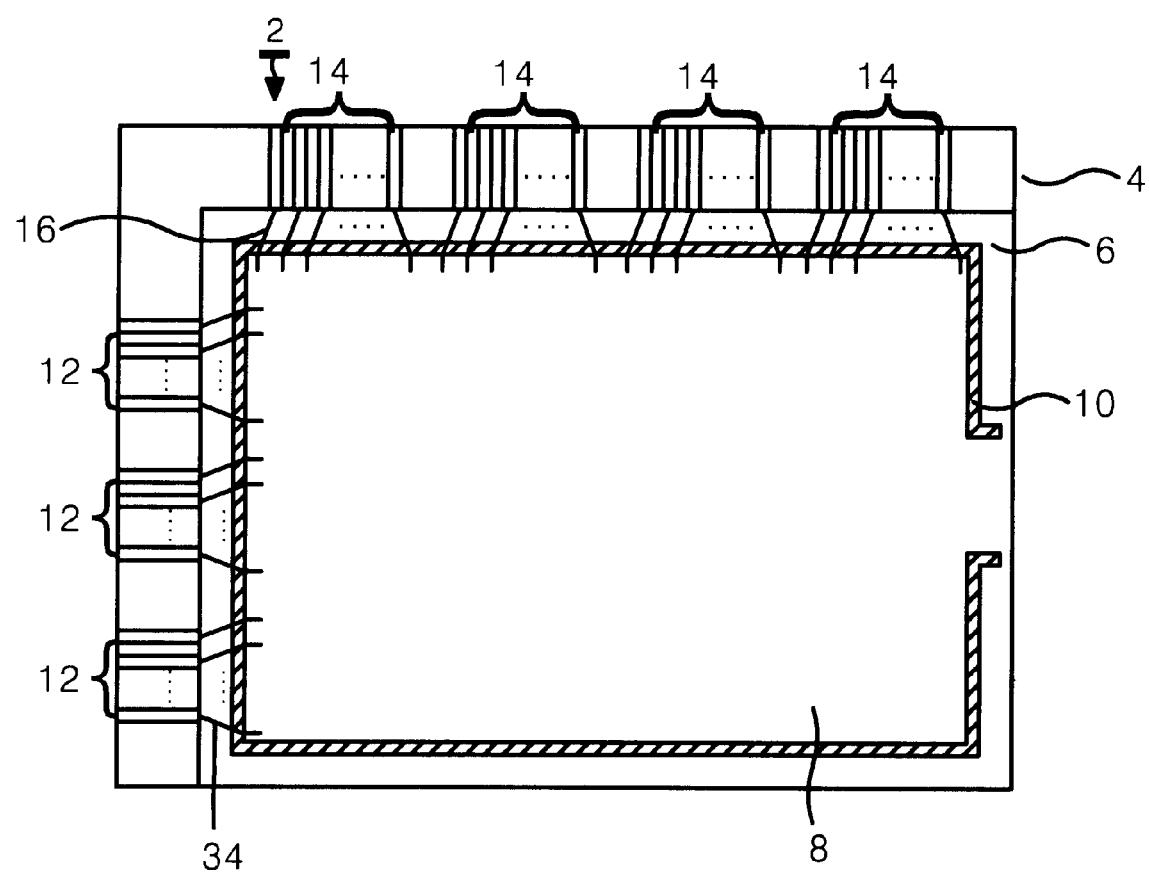
FIG. 1 is a schematic plan view showing a plane structure of a conventional liquid crystal display panel.
Figure 3A:
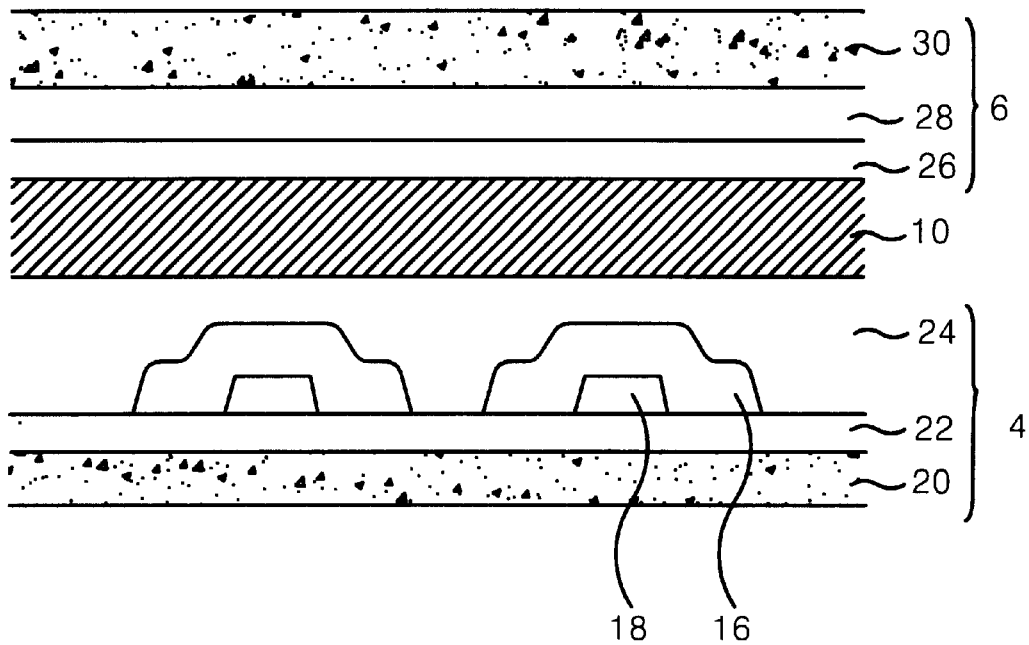
FIG. 3A is a vertical section view taken along the A—A' line in FIG. 2.
Figure 3B:
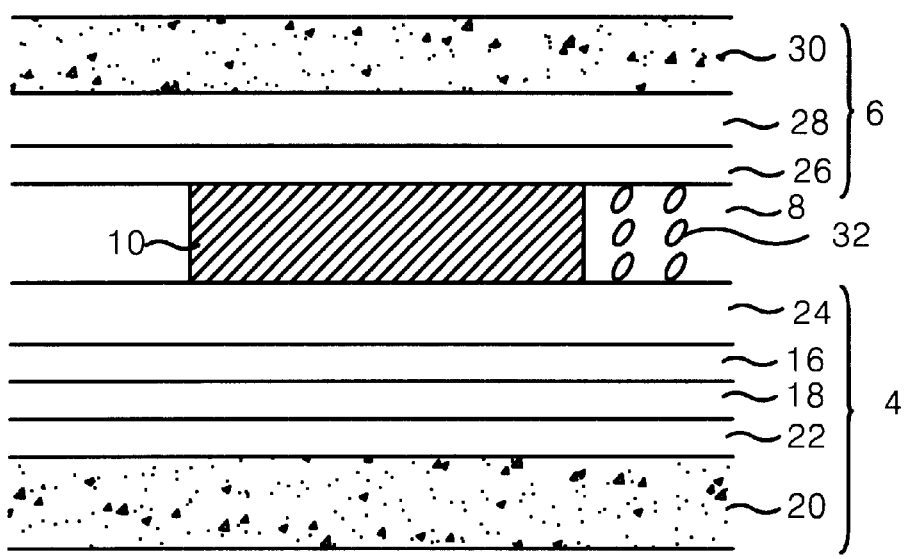
FIG. 3B is a vertical section view taken along the B—B' line in FIG. 2.
Figure 5A:
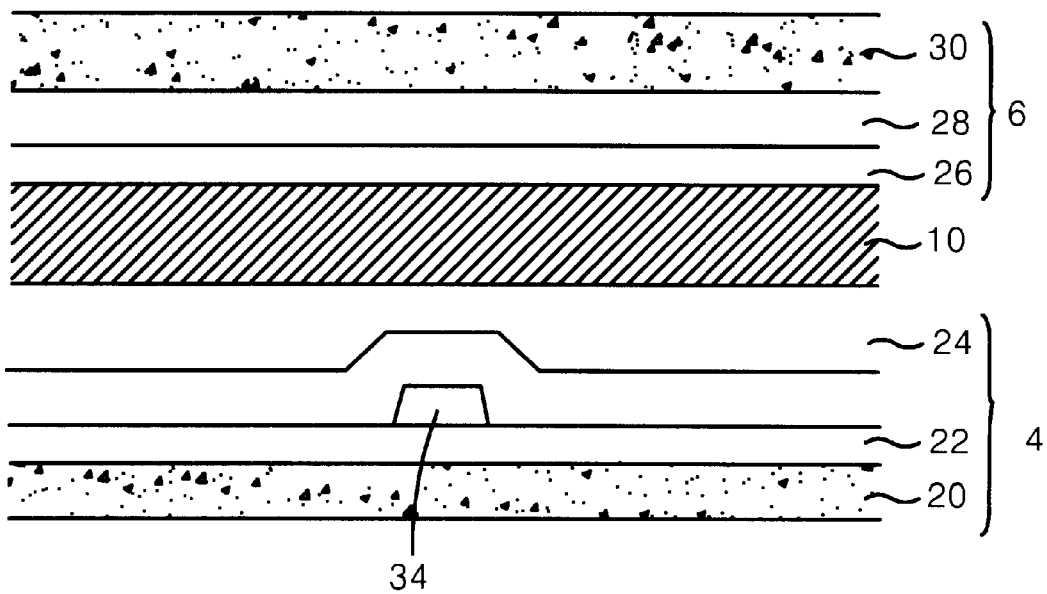
FIG. 5A is a vertical section view taken along the A—A' line in FIG. 4.
Figure 5B:
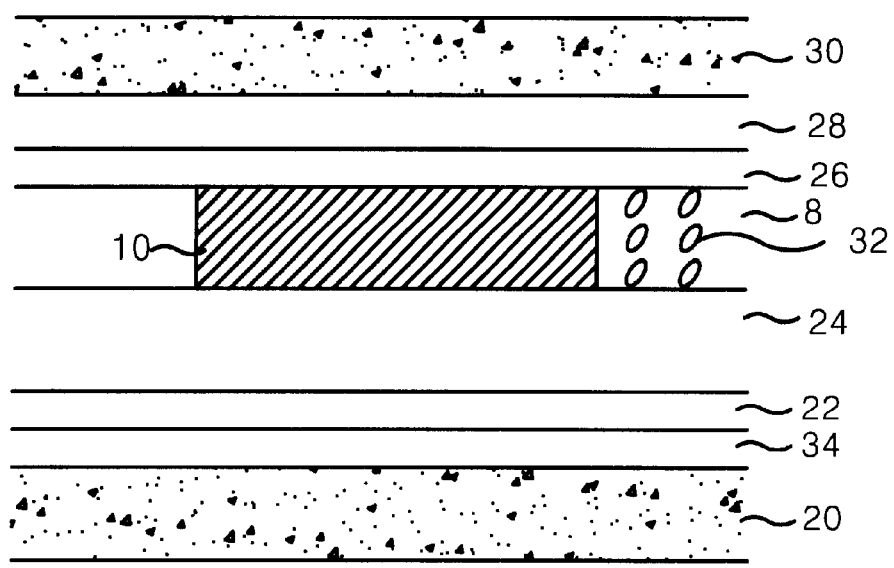
FIG. 5B is a vertical section view taken along the B—B' line in FIG. 4.
Figure 6A:
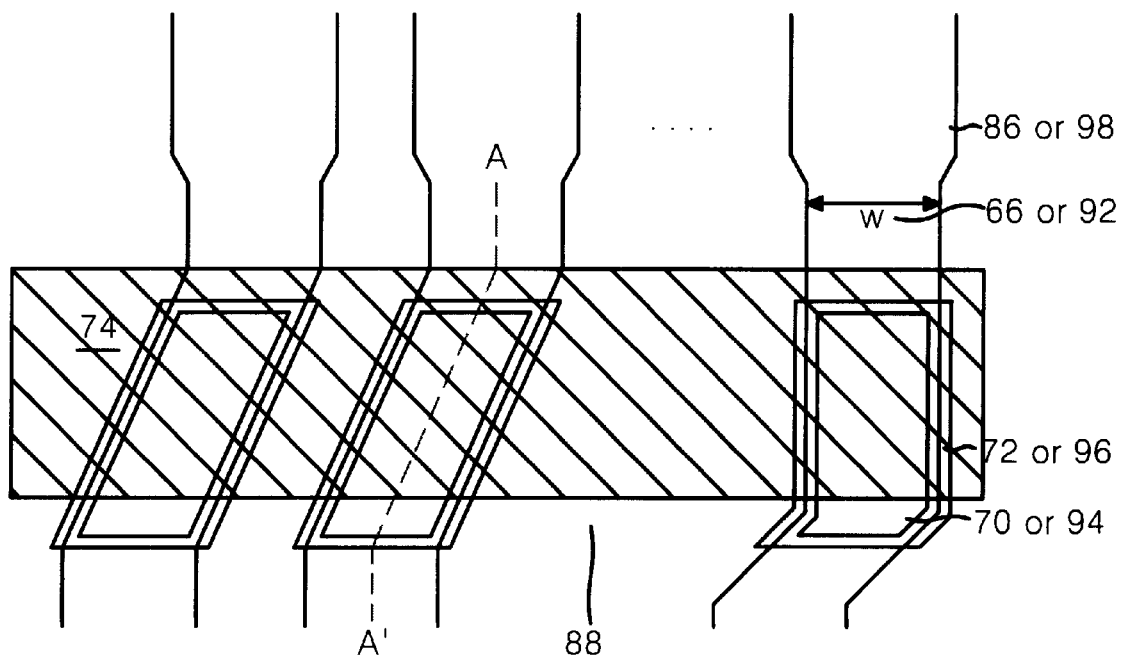
FIG. 6A is an enlarged plan view of a crossing portion between the data link and the seal or between the gate link and the seal in a liquid crystal display panel according to an embodiment of the present invention.
Figure 6B:
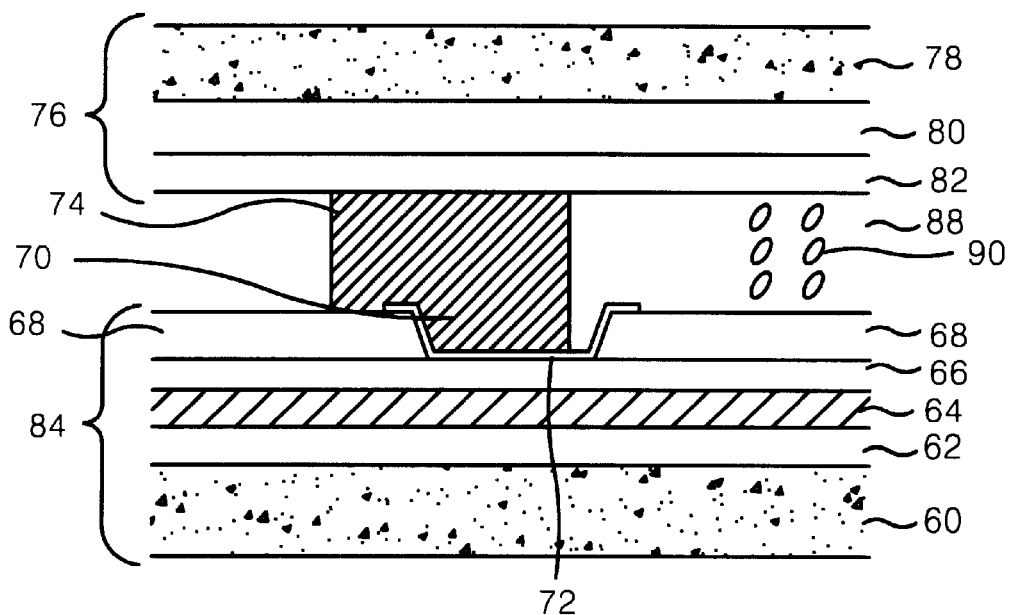
FIG. 6B is a section view showing a structure of a crossing portion between the data link and the seal taken along the A—A' in FIG. 6A.

FIG. 6A is an enlarged plan view of a crossing portion between the data link and the seal or between the gate link and the seal in a liquid crystal display panel according to an embodiment of the present invention. FIG. 6B is a section view showing a structure of a crossing portion between the data link and the seal taken along the A—A' in FIG. 6A. Referring to FIGS. 6A and 6B, the crossing portion between the data link and the seal includes a gate insulating layer 62 provided on a lower glass substrate 60, a semiconductor layer 64 and a data link 62 that are provided on the gate insulating layer 62, an organic protective film 68 coated on the data link 66, the gate insulating film 62 and the lower glass substrate 60, a hole 70 defined by etching the organic protective film 68 on the data link 66 along the data link 66, an ITO electrode film 72 provided on the data link 66 and the organic protective film 68 within the hole 70, a seal 74 provided on the ITO electrode film 72, and an upper plate 76 bonded onto the seal 74. The upper plate 76 consists of a color filter formed on the upper glass substrate 78, a black matrix 80 and a common transparent electrode 82 in similarity to the prior art.

Hereinafter, a process of fabricating the liquid crystal as mentioned above will be described. First, the gate insulating layer 62 and the semiconductor layer 64 are formed on the lower glass substrate 60 by the continuous vapor deposition method. The data link 66 thereon is provided along with a data pad 86 and a data line of a picture display part 88 by the sputtering metal deposition method. On the gate insulating layer 62 provided with the data link 66, the organic protective film 68 is evenly formed by the spin coating method. Subsequently, the organic protective film 68 on the data link 66 is etched to form the hole 70. The etching of the organic protective film is made by the dry etching method. In the dry etching process, a substrate provided with the organic protective film is put into a chamber into which a reaction gas is injected in turn. In order to make an etching into a desired shape, a mask pattern is formed on the organic protective film. The reaction gas causes a chemical reaction to a portion of the organic protective film to be etched within the chamber. At this time, the organic protective film portion causing a chemical reaction to the reaction gas is etched while being changed into a gaseous state. During a period when such a chemical reaction gas is exhausted from the chamber, a sensing device installed at an outlet senses a gas component. If a gas other than a gas generated due to a chemical action between the reaction gas and the organic protective film is sensed, the etching work is terminated. The ITO electrode film 72 is provided on the hole 70 formed in this manner. Finally, a sealant is coated on the hole 70 and the organic protective film 68, and the upper plate 76 is bonded to the lower plate 84. The seal 74 coated with a sealant is formed in a direction crossing the data link 66. At this time, the coated sealant is adhered to the ITO electrode film 72 through the hole 70 formed along the data link 66. One side surface of the seal 74 contacts the picture display part 88 into which a liquid crystal 90 is injected. In providing the hole 70 by etching the organic protective film 68 along the data link 66, the hole 70 is extended into the picture display part 88 at the outer circumference of the seal 74 as shown in the drawing.

In the liquid crystal display panel according to the present invention, the seal 74 is adhered to the organic protective film 68 and, at the same time, to the ITO electrode film 72 via the holes 70 formed on the data links 66. The ITO electrode film 72 plays a role to protect a metal of the data link 66 exposed through an etched portion of the organic protective film 68 from the sealant of the seal 74 or the liquid crystal of the picture display part 88. Also, it plays a role to strengthen an adhesive between the organic protective film 68 and the gate insulating film 62. An adhesive characteristic between the sealant coated on the seal 74 and the ITO electrode film 72 is much more excellent than that between the sealant and the organic protective film 68. The holes 70 are extended into the picture display part 88 at the outer circumference f the seal 74 when being provided on the data link 66, thereby preventing a bubble from being generated during coating of the sealant. As an area of the hole 70 goes wider, an area of the seal 74 adhered to the lower plate 84 becomes wider, thereby strengthening an adhesive still more. In a real liquid crystal display panel, a width W of the data link 66 is larger than a distance between the data links 66 as shown in FIG. 6A. Therefore, the etching of the organic protective film 68 between the data links 66 is preferable to the etching of the organic protective film 68 on the data link 66 in forming the hole 70 because the former can make an area of the hole 70 wider.

Figure 6C:
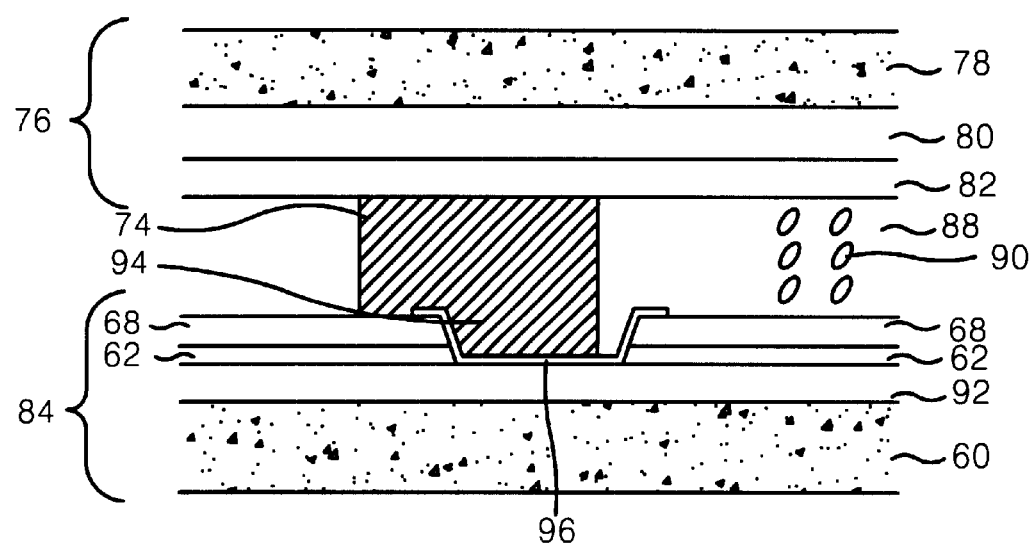
FIG. 6C is a section view showing a structure of a crossing portion between the gate link and the seal taken along the A—A' in FIG. 6A.

FIG. 6C is a section view showing a structure of a crossing portion between the gate link and the seal taken along the A—A' in FIG. 6A. Referring to FIGS. 6A and 6C, the crossing portion between the gate link and the seal includes a gate link 92 provided on the lower glass substrate 60, a gate insulating layer 62 provided on the gate link 92 and the lower glass substrate 60, an organic protective film 68 coated on the gate insulating layer 62, a hole 94 defined by etching the organic protective film 68 on the gate link 92 and the gate insulating layer 62 along the gate link 92, an ITO electrode film 96 provided on the gate link 92, the gate insulating layer 62 and the organic protective film 68 within the hole 94, a seal 74 provided on the ITO electrode film 96, and an upper plate 76 bonded onto the seal 74. The upper plate 76 consists of a color filter formed on the upper glass substrate 78, a black matrix 80 and a common transparent electrode 82 in similarity to the prior art.

Hereinafter, a process of fabricating the liquid crystal as mentioned above will be described. First, the gate link 92 provided on the lower glass substrate 60 is provided along with a gate pad 98 and a gate line of the picture display part 88 by the sputtering metal deposition method. On the lower glass substrate 60 provided with the gate link 92, the gate insulating layer 62 is provided by the continuous vapor deposition method. The organic protective film 68 is evenly formed on the gate insulating layer 62 by the spin coating method. Subsequently, the organic protective film 68 on the gate link 92 and the gate insulating layer 62 is etched along the gate link 92 to form the hole 94. The etching of the organic protective film 68 and the gate insulating layer 62 is made by the dry etching method like the data link part. The ITO electrode film 96 is provided on the hole 94 formed along the gate link 92. Finally, a sealant is coated on the hole 94 and the organic protective film 68, and the upper plate 76 is bonded to the lower plate 84. The seal 74 coated with a sealant is formed in a direction crossing the gate link 92. At this time, the coated sealant is adhered to the ITO electrode film 72 through the hole 92 formed along the gate link 92. One side surface of the seal 74 contacts the picture display part 88 into which a liquid crystal 90 is injected. In providing the hole 94 by etching the organic protective film 68 on the gate link 92 and the gate insulating layer 62 along the data link 66, the hole 94 is extended into the picture display part 88 at the outer circumference of the seal 74 as shown in the drawing. In the gate link part, a sealant coated on the seal 74 is adhered to the organic protective film 68 and, at the same time, to the ITO electrode film 96 via the holes 94 formed on the gate links 92 like the data link part. Thus, an adhesive characteristic between the seal 74 and the lower plate 84 is more strengthened. In a real liquid crystal display panel, a width W of the gate link 92 is larger than a distance between the gate links 92. Accordingly, the formation of the hole 94 along a portion of the gate link 92 like the present invention is preferable to the formation of the hole 94 between the gate links 92 because the former can enlarge an adhesion area of the sealant. The ITO electrode film 96 plays a role to protect a metal of the data link 92 exposed through an etched portion of the organic protective film 68 from the sealant or the liquid crystal. Also, the ITO electrode film 96 plays a role to strengthen an adhesive between the organic protective film 68 and the gate insulating film 62 because it is provided on the organic protective film 68 and the gate link 92 at the same time. The holes 94 are extended into the picture display part 74 at the outer circumference of the seal 74 when being provided on the gate link 92, thereby preventing a bubble from being generated during coating of the sealant.

As described above, according to the present invention, the organic protective film on the pad link is eliminated to enlarge an area of the portion at which the seal contact the pad link directly, thereby strengthening an adhesive between the seal and the lower plate still more. Accordingly, a leakage of the liquid crystal caused by the exterior impact can be effectively prevented.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal display panel having a lower plate bonded to an upper plate by a seal that extends along edges of a picture display part that contains a liquid crystal, the liquid crystal display panel comprising:

a conductive link within the lower plate for applying signals to the picture display part, wherein a portion of the conductive link is crossed by the seal;

an organic protective film on the lower plate, the organic protective film having a hole that extends under the seal such that at least part of the portion of the conductive link crossed by the seal is not covered by the organic protective film; and a conductive film deposited on the part of the portion of the conductive link crossed by the seal, wherein the conductive film prevents direct contact between the seal and the conductive link.

2. A liquid crystal display panel according to claim 1, wherein the hole extends into the picture display part, and wherein the conductive film extends into the picture display part such that a liquid crystal is prevented from contacting the conductive link.

3. A liquid crystal display panel according to claim 1, wherein the conductive film extends over portions of the organic protective film adjacent the hole.

4. A liquid crystal display panel according to claim 1, wherein the conductive film is transparent.

5. A liquid crystal display panel according to claim 1, wherein the conductive film is ITO.

6. A liquid crystal display panel according to claim 1, wherein the conductive link applies data signals to the picture display part.

7. A liquid crystal display panel according to claim 1, wherein the conductive link applies scanning signals to the picture display part.

8. A liquid crystal display panel having a lower plate bonded to an upper plate by a seal that extends along the edges of a picture display part that contains a liquid crystal, the liquid crystal display panel comprising:

a conductive link within the lower plate for applying signals to the picture display part, wherein a portion of the conductive link is crossed by the seal;

an insulating layer over the lower plate, including over the conductive link;

an organic protective film on the insulating layer;

an opening through the organic protective film and through the insulating layer, wherein the opening is over at least part of the portion of the conductive link crossed by the seal; and a conductive film deposited on the part of the portion of the conductive link crossed by the seal, wherein the conductive film prevents direct contact between the seal and the conductive link.

9. A liquid crystal display panel according to claim 8, wherein the opening extends into the picture display part, and wherein the conductive film extends into the picture display part such that a liquid crystal is prevented from contacting the conductive link.

10. A liquid crystal display panel according to claim 8, wherein the conductive film extends over portions of the organic protective film adjacent the hole.

11. A liquid crystal display panel according to claim 8, wherein the conductive film is transparent.

12. A liquid crystal display panel according to claim 8, wherein the conductive film is ITO.

13. A liquid crystal display panel according to claim 8, wherein the conductive link applies scanning signals to the picture display part.

14. A liquid crystal display panel, comprising:

a lower plate including an elongated conductive link;

a protection layer over said lower plate and over said conductive link;

a hole through said protection layer to said connecting link;

a conductive film over at least part of said hole; and a seal over part of said protection layer adjacent said hole and over at least part of said conductive film;

wherein said protection layer and said conductive film prevent the seal from contacting the conductive link.

15. A liquid crystal display panel according to claim 14, wherein said protection layer is organic.

16. A liquid crystal display panel according to claim 14, wherein said seal adheres to said conductive film.

17. A liquid crystal display panel according to claim 14, wherein said conductive film is indium tin oxide.

18. A liquid crystal display panel according to claim 14, wherein said conductive link is a gate link.

19. A liquid crystal display panel according to claim 14, wherein said conductive link is a data link.

20. A liquid crystal display panel according to claim 14, wherein said conductive link is disposed on a semiconductor layer.

21. A liquid crystal display panel according to claim 14, wherein said conductive link is on a transparent substrate.

22. A liquid crystal display panel according to claim 14, further including an upper plate disposed above said lower plate and on said seal such that a gap is formed.

23. A liquid crystal display panel according to claim 22, further including a liquid crystal in said gap.

24. A liquid crystal display panel according to claim 14, wherein said hole extends along said conductive link such that said seal does not fully cover said hole.

25. A method of fabricating a liquid crystal display panel, comprising:

fabricating a conductive link on a lower substrate;

coating the connecting link with an organic protection layer;

forming a hole through the organic protection layer to the connecting link;

coating the hole with a conductive film; and locating a seal over the protection layer and over at least part of the conductive film.

26. A method of fabricating a liquid crystal display panel according to claim 25, further including adhering the seal to the conductive film.

27. A method of fabricating a liquid crystal display panel according to claim 25, further including forming a gap by locating an upper plate on the seal above the lower plate.

28. A liquid crystal display panel according to claim 27, further including disposing a liquid crystal in the gap.

* * * * *